(12) United States Patent
Daughrity

(10) Patent No.: US 12,152,682 B2
(45) Date of Patent: Nov. 26, 2024

(54) SERVICEABLE VALVE AND METHOD FOR OPERATION OF SAID VALVE

(71) Applicant: Dana Automotive Systems Group, LLC, Maumee, OH (US)

(72) Inventor: Timothy W. Daughrity, Murray, KY (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 238 days.

(21) Appl. No.: 17/811,017

(22) Filed: Jul. 6, 2022

(65) Prior Publication Data

US 2024/0011571 A1 Jan. 11, 2024

(51) Int. Cl.
*F16K 11/08* (2006.01)
*F16K 11/085* (2006.01)
*F16K 27/06* (2006.01)

(52) U.S. Cl.
CPC ........ *F16K 11/0856* (2013.01); *F16K 27/065* (2013.01)

(58) Field of Classification Search
CPC ............................ F16K 11/0856; F16K 27/065
See application file for complete search history.

(56) References Cited

U.S. PATENT DOCUMENTS

| 3,055,404 | A | * | 9/1962 | Anderson | ............... F16K 31/58 141/144 |
|---|---|---|---|---|---|
| 6,681,805 | B2 | | 1/2004 | McLane et al. | |
| 8,632,689 | B2 | | 1/2014 | Merry | |
| 9,481,477 | B2 | * | 11/2016 | Kjar | ........................ C12M 23/40 |
| 9,500,299 | B2 | | 11/2016 | Morein et al. | |
| 10,788,135 | B2 | * | 9/2020 | Whitaker | ............. F16K 11/0853 |
| 2017/0363220 | A1 | | 12/2017 | Yan et al. | |
| 2020/0200284 | A1 | * | 6/2020 | Ledvora | ................ F16K 5/0471 |
| 2021/0080016 | A1 | * | 3/2021 | Wong | .................... F16K 11/085 |

* cited by examiner

*Primary Examiner* — Kevin R Barss
(74) *Attorney, Agent, or Firm* — McCoy Russell LLP

(57) ABSTRACT

A valve and valve operating method are provided herein. The valve includes a rotatable cartridge that includes a pivot and a first wall that intersects and demarcates a first chamber and a second chamber and a housing. The housing includes a body that at least partially encloses the rotatable cartridge and includes at least four ports and a cap removably coupled to the housing and sealing the first chamber and the second chamber, where rotation of the rotatable cartridge about the pivot creates multiple flow paths between the at least four ports.

19 Claims, 5 Drawing Sheets

SERVICEABLE VALVE AND METHOD FOR OPERATION OF SAID VALVE

TECHNICAL FIELD

The present disclosure relates to a serviceable valve with a removable cartridge and method for operation of the valve.

BACKGROUND AND SUMMARY

Switching valves are utilized in a variety of systems, such as combustion engine and electric vehicle cooling systems, to enable the mixing of coolant or other liquids in a desired manner. For instance, in vehicles such as battery electric vehicles (BEVs) valves are used to route coolant to desired locations in the vehicle such as traction motors and batteries.

US 2017/0363220 A1 to Yan et al. discloses a multi-way valve for controlling the flow of coolant in a motor vehicle. Yan's multi-way valve is designed to route coolant through and around a radiator based on the vehicle's heat management strategy.

The inventors have recognized several drawbacks with Yan's valve as well as other previous valves. For instance, Yan's valve may not generate a desired coolant flow pattern demanded in more complex cooling circuits. For instance, Yan's valve may be incompatible with certain electric vehicle (EV) cooling systems that have both traction battery and motor cooling demands. Other valves, particularly those used in EVs, have exhibited comparatively short lifespans and are not practically serviceable. As such, certain previous cooling systems have fallen short of achieving performance targets, particularly in relation to EV cooling systems, and may demand comparatively short valve replacement intervals in relation to other system componentry, thereby decreasing customer appeal.

The inventors have recognized the aforementioned issues and developed a valve to at least partially overcome these issues. The valve, in one example, includes a rotatable cartridge with a pivot and a first wall that intersects and demarcates a first chamber and a second chamber. The valve further includes a housing with a body that at least partially encloses the rotatable cartridge and includes at least four ports. The housing further includes a cap removably coupled to the housing and sealing the first chamber and the second chamber. Further, in such an example, rotation of the cartridge about the pivot creates multiple flow paths between the four ports. In this way, the valve achieves both serviceability with regard to the cartridge as well as a desired flow pattern adjustability. The flow pattern adjustability in relation to the four ports and the two chambers may be particularly effective in EV cooling systems.

Further, in one example, the cap may include an opening that mates with and seals a portion of the pivot. In such an example, the cap may include a tab that releasably engages an extension in the housing. In this way, the cap may be removably assembled with the cartridge. Consequently, the cartridge is designed for efficient servicing, thereby increasing customer appeal.

Further in one example, the first wall may include a first extension that circumferentially extends around the rotatable cartridge in a first direction and includes a first opening. The first wall may further include a second extension that circumferentially extends around the rotatable cartridge in a second direction that is opposite to the first direction and includes a second opening. These extensions and openings allow the flow through the ports to be fine-tuned to achieve cooling system needs. For instance, the valve may be used to meet both cooling targets of a traction battery assembly, in the EV use-case example.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

A serviceable flow control valve that achieves effective flow dynamics with regard to chamber and port flow patterns is described herein. The valve includes a removable cap that seals a removable cartridge in a housing of the valve. The removable cartridge includes a wall that intersects the pivot and divides the interior of the valve into multiple chambers. In this way, the interior is divided into multiple chambers to achieve more complex flow patterns than previous valves. This may be particularly efficacious in an EV cooling system with traction battery and motor coolant loops. However, the valve may be used in a variety of fluidic systems.

Figure 1:
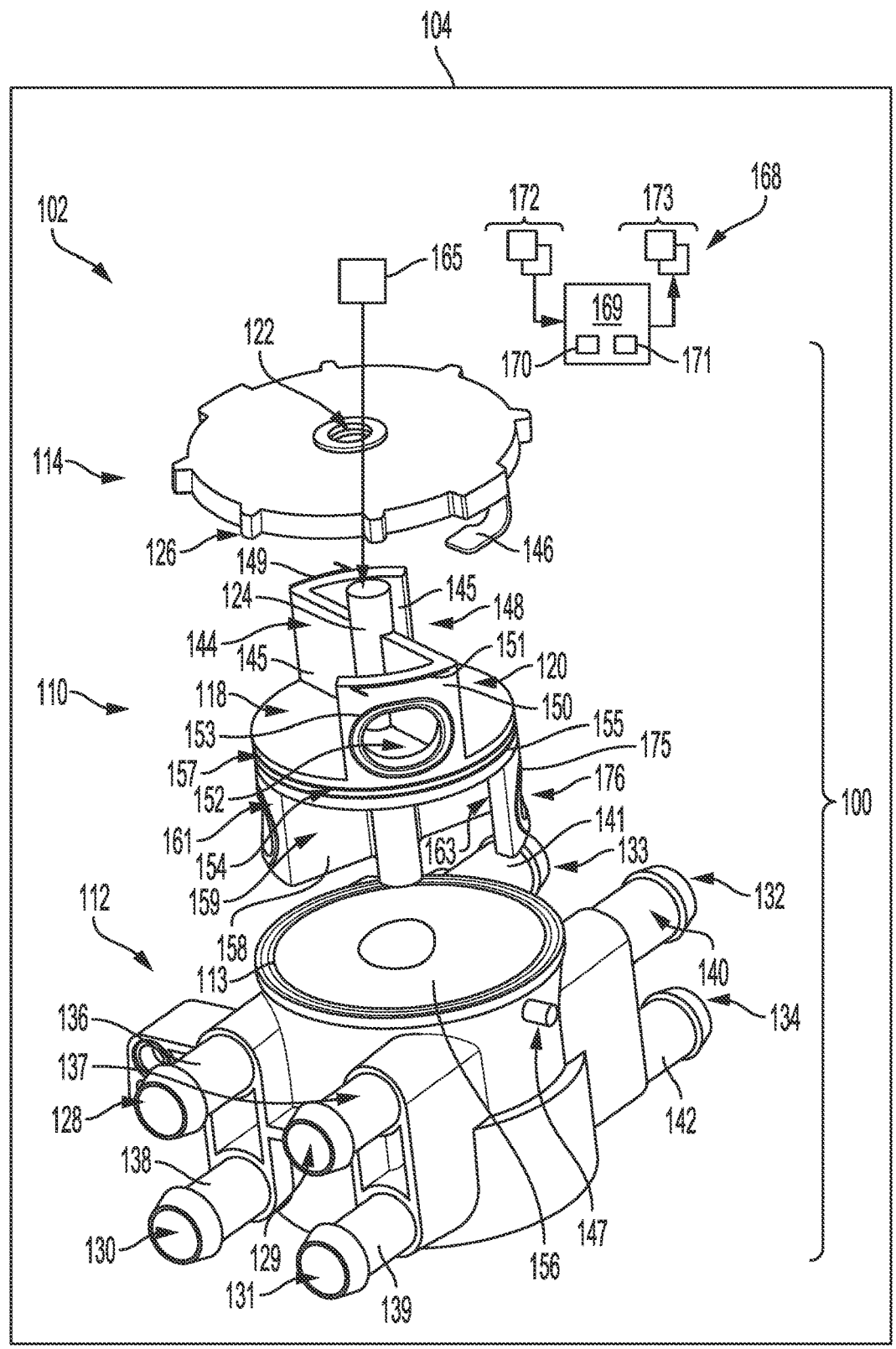
FIG. 1 is an exploded view of a valve and a control system.

FIG. 1 depicts an exploded view of a valve 100. In the illustrated example, the valve 100 is incorporated into a cooling system 102 of an electric vehicle 104 (EV) such as an all-electric vehicle or a hybrid electric vehicle (HEV). The cooling system 102 includes a pump and coolant lines that deliver coolant (e.g., oil or water and glycol) to vehicle 104 components such as a traction motor, traction batteries, and the like. Therefore, in the EV configuration the valve 100 is a coolant valve. However, the valve's applicability may extend beyond the automotive field and may be used in other industries.

The EV cooling system 102 may be designed for air conditioning (A/C) and heat pump operation, thermal management of the traction battery, and powertrain electronics and may additionally recycle waste heat of the vehicle powertrain to heat the cabin to further converse energy.

In the EV cooling system example, the switching valve may be fluidly connected to a traction battery via a pump, a traction battery bypass conduit, a battery heater, a battery chiller, a condenser, and/or a battery radiator. Further, in such an example, the cooling system may include fans, an evaporator, valves, and the like to achieve desired cooling system temperatures.

The valve 100 includes a removable rotatable cartridge 110 that is enclosed within a housing body 112. The housing body 112 is designed to enable efficient removal of the removable rotatable cartridge 110 from the housing during repair or replacement, for instance. To allow for this effective cartridge removal, the housing body 112 is designed with a cap 114 which is removably coupled to a housing body 112 and seals the first chamber 118 and the second chamber 120. In this way, the valve cartridge, as well as the corresponding seals, may be individually replaced as opposed to replacing the entire valve assembly, reducing servicing cost over the life of the vehicle, if wanted. To achieve this cap removability, the cap 114 includes an opening 122 that mates with and seals a portion of a pivot 124 in the removable rotatable cartridge 110. The cap 114 further includes a textured lateral surface 126 to facilitate efficient access to the removable rotatable cartridge 110, in the illustrated embodiment. However, other suitable cap contours may be used in other examples. The housing body 112 includes ports 128, 129, 130, 131, 132, 133, and 134. The housing body 112 further includes port 135 that is shown in FIGS. 6B and 6D. In the vehicle cooling system embodiment, the ports 128, 129, 130, 131, 132, 133, 134, 135 are in fluidic communication with various components in the vehicle.

The ports 128, 129, 130, 131, 132, 133, 134, 135 include port bodies 136, 137, 138, 139, 140, 141, 142, 143, respectively that extend away from the housing body 112. Specifically, in the illustrated example, the port bodies 136, 137, 138, 139, 140, 141, 142, 143 are parallel to one another with regard to their central axes. This port body arrangement allows coolant conduits to be efficiently attached to the valve, thereby simplifying valve installation and repair procedures. However, other port body arrangements may be used, in alternate examples.

The removable rotatable cartridge 110 includes the pivot 124 about which the cartridge rotates during valve adjustment. Further details of the valve's adjustability and flow configurations is expanded upon herein with regard to FIGS. 6A-6D. The removable rotatable cartridge 110 further includes a first wall 144 that intersects the pivot 124 and demarcates a first chamber 118 and a second chamber 120. To elaborate, in the illustrated embodiment, the first wall 144 includes a rectangular section 145 that intersects the pivot 124 along its height. Although the wall may have other profiles such as an arcuate shape, in alternate embodiments. The shape of the wall may be selected based on the desired size of the first chamber and the second chamber. Profiling the wall such that it intersects with the pivot permits the chambers to achieve desired volumes. Above the intersection of the first wall 144 and the pivot 124 is a section 145 of the pivot 124 that extends through and seals with the opening 122 in the cap 114.

As discussed above, the cap 114 allows the removable rotatable cartridge 110 to be efficiently accessed. To allow for the cap's removability, the cap includes a tab 146 that slides under a cylindrical extension 147 in the housing body 112, when assembled. In this way, the cap may be efficiently installed and removed. However, in other examples, the cap may be removably attached to the housing in another suitable manner. For instance, the cap may thread onto the housing or clamps may be used to secure the cap to the housing. The housing body 112 may also include a seal 113 that seals with the cap 114, when assembled, to reduce the chance of coolant leakage from the valve.

The first wall 144 includes a first extension 148 that circumferentially extends around the rotatable cartridge 110 in a first direction 149. The first wall 144 further includes a second extension 150 that circumferentially extends around the cartridge 110 in a second direction 151 that is opposite the first direction 149. Each of the first and second extensions 148, 150 of the first wall 144 are designed with openings 152 that allow liquid coolant to flow from the ports into the chambers with a selected flow pattern. In the illustrated example, seals 153 circumferentially surround the openings 152 and are in contact with an inner surface of the housing body 112 when the cartridge 110 is installed in the housing body. These openings and seals allow the flow from the ports 128, 129, 130, 131, 132, 133, 134, 135 into or out of the chambers to be selectively restricted by varying amounts. The relative rotational position of the cartridge with regard to the housing body, therefore, enables the amount of flow restriction through the openings to be altered as wanted.

In one example, the seals 153 may include a polytetrafluoroethylene (PTFE) coating for increased wear resistance, thereby increasing valve longevity. The other seals described herein may similarly include a PTFE coating for increased wear resistance, in certain embodiments. Still further, in other embodiments seals that are expected to experience increased wear may be constructed with PTFE coatings while other seals expected to experience less wear may forgo the PTFE coatings.

In the illustrated embodiment, the removable rotatable cartridge 110 includes a second wall 154 that perpendicularly intersects the pivot 124 and is shaped as a disc to bound additional valve chambers. However, in alternate embodiments the second wall 154 may be omitted from the cartridge of the wall may have a different profile such as convex upper and lower surfaces. Generally, the outer edge 157 of the second wall 154 has a shape that conforms with the inner surface 156 of the housing body 112. As specifically illustrated, the second wall 154 has a round outer shape when viewed in the x-y plane that mates with a round inner surfaces of the housing body 112 when assembled. A seal 155 may be arranged in a recess of the periphery of the second wall 154 that when assembled is in contact with an inner surface 156 of the housing body 112 to reduce the chance of coolant leakage between valve chambers while allowing for cartridge rotation. Further, a portion of the second wall 154 forms a portion of a boundary of the first chamber 118 and the second chamber 120 to allow the chambers to achieve desired volumes.

The removable rotatable cartridge 110 includes a third wall 158 in the illustrated example. However, in alternate embodiments, the third wall 158 may be omitted from the cartridge. The third wall 158 intersects the pivot 124 and demarcates a third chamber 159 and a fourth chamber 160, shown in FIGS. 6B and 6D, similar to the first wall 144. However, the third wall 158 may intersect the pivot at a different angle with regard to the first wall 144. In this way, a wider variety of flow patterns in the valve chambers can be generated. The third wall 158 includes a first extension 161 that circumferentially extends around the rotatable cartridge in clockwise direction and a second extension 163 that circumferentially extends around the rotatable cartridge in a counterclockwise direction. The extensions of the third wall 158 may again include seals 175 that extend around openings 176.

Rotation of the removable rotatable cartridge 110 about the pivot 124 creates multiple coolant flow paths between the ports 128, 129, 130, 131, 132, 133, 134, as well as port 135 (shown in FIGS. 6B and 6D). In the illustrated example, the valve 100 further includes an electronic actuator 165 coupled to the pivot 124. The electronic actuator 165 is designed to rotate the removable rotatable cartridge 110 by desired angles and allow different fluidic connections between ports 128, 129, 130, 131, 132, 133, 134, 135, as well as port 135 (shown in FIGS. 6B and 6D) to be established. In other embodiments, the valve actuator design may be adapted for pneumatic actuation, hydraulic actuation, mechanical actuation, combinations thereof, and the like.

The cooling system 102 and more generally the vehicle 104 may include a control system 168 with controller 169. The controller 169 may include a microcomputer with components such as a processor 170 (e.g., a microprocessor unit), input/output ports, an electronic storage medium such as memory 171 (e.g., a read-only memory chip, random access memory, keep alive memory, a data bus, and the like) for executable programs. The storage medium may be programmed with computer readable data representing instructions executable by the processor for performing the methods and control techniques described herein as well as other variants that are anticipated but not specifically listed.

The controller 169 may receive various signals from sensors 172 coupled to various regions of the vehicle 104. For example, the sensors 172 may include thermal sensor designed to detect temperatures of components such as one or more traction batteries, the traction motor, and the like as well as the ambient temperature.

Upon receiving the signals from the various sensors 172 the controller 169 processes the received signals, and employs various actuators 173 of vehicle components to adjust the components based on the received signals and instructions stored on the memory of controller 169. For example, the controller 169 may receive a traction motor temperature. In response, the controller 169 may command operation of the vehicle coolant system to adjust the valve 100 to alter traction motor temperature. More generally, the controller 169 may include instructions stored in the memory 171 that when executed during a first operating condition, cause the controller to rotate the rotatable cartridge to adjust the flow path between the housing body ports and the valve chambers, and/or the restriction of coolant flow from the ports into the chambers. The other controllable components in the vehicle may function in a similar manner with regard to sensor signals, control commands, and actuator adjustment, for example.

An axis system 174 is provided in FIG. 1 as well as FIGS. 2-6D for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples.

Figure 2:
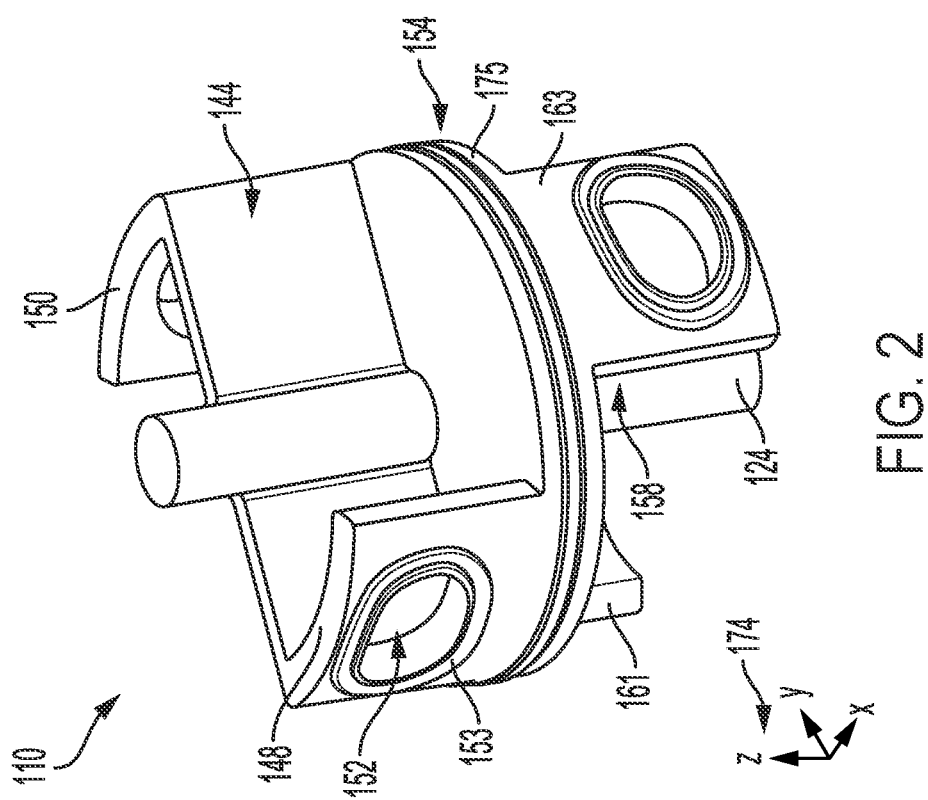
FIG. 2 is a perspective view of a cartridge included in the valve, depicted in FIG. 1.

FIG. 2 depicts a perspective view of the removable rotatable cartridge 110. The first wall 144 is positioned on its long-axis perpendicular to the second wall 154, in the illustrated example. The second wall 154 separates the first wall 144 from the third wall 158. In this way, the valve has four internal chambers. However, the valve may be designed with an alternate amount of chambers in other examples. For instance, the valve may have two internal chambers, in one alternate embodiment, or six or more chambers in another alternate embodiment. The first wall 144 extensions 148, 150, and the third wall 158 extensions 161, 163 circumferentially extend around a peripheral edge 175 of the second wall 154 to allow openings 152 in the wall extensions 148, 150, 161, 163 to align with the ports in the housing.

Seals 153 in the extensions 148, 150 of the first wall 144 and seals 153 in the extensions 161, 163 of the third wall 158 are again depicted. The seals 153 extend around the openings 152 in the extensions. To elaborate, the seals 153 are positioned in recesses 300, shown in FIG. 3, that circumferentially extend around the openings 152. The recesses allow the seals to be retained in a desired position and quickly installed and replaced. The thickness of the extensions 148, 150, 161, 163 of the first and third walls 144, 158 may be greater than the thickness of the sections of the first and third walls 144, 158 which extend through the pivot 124 to enable the seal recesses to be formed in the wall extensions 148, 150, 161, 163.

The extension openings 152 and seals 153 may have an oval shape. However, the shape may be circular, polygonal, and the like, in other examples. The shape of the opening may be selected based on the geometry of the housing ports, the desired chamber flow characteristics, and/or the type of coolant used in the cooling system.

Figure 3:
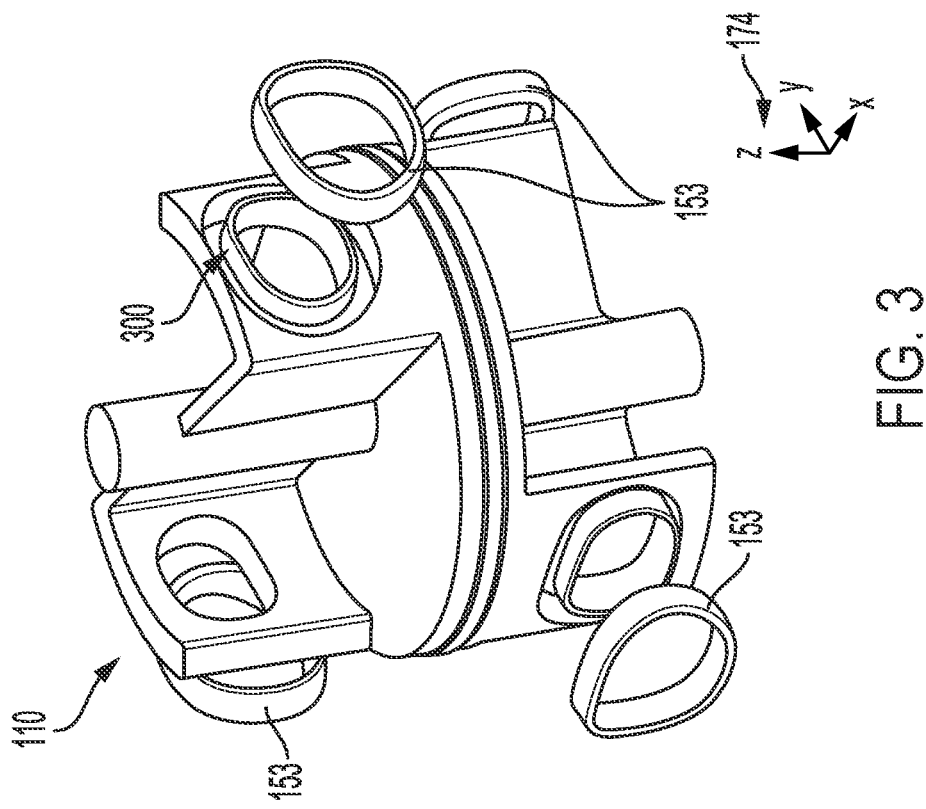
FIG. 3 is an exploded view of the cartridge, depicted in FIG. 2.

FIG. 3 depicts an exploded view of the seals 153 and the removable rotatable cartridge 110. The recesses 300 in which the seals 153 are positioned when assembled, are again illustrated. Depths of the recesses 300 may be sized to receive the seals but allow a portion of seal to be positioned radially outward from the extension and sealing engage with the housing 112.

Figure 4:
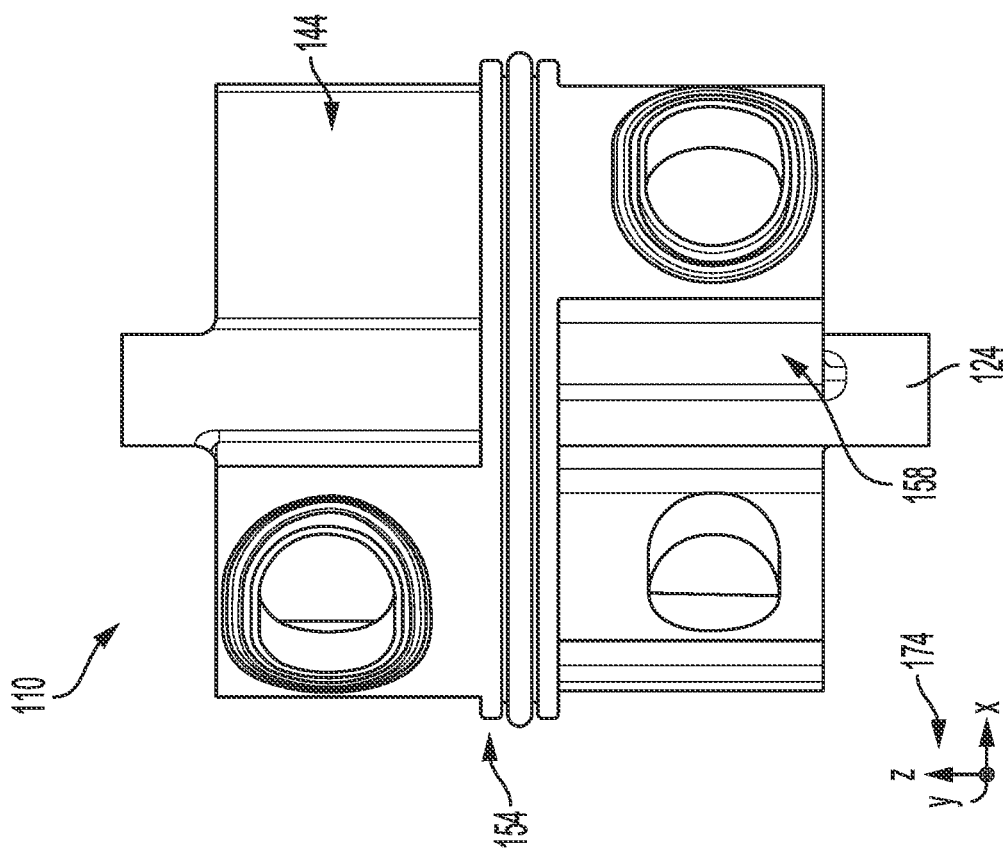
FIG. 4 is a side view of the cartridge, depicted in FIG. 2.

FIG. 4 depicts a side view of the removable rotatable cartridge 110. In the illustrated example, the second wall 154 is positioned in between the first wall 144 and the third wall 158, along the z-axis, to enable the valve to achieve desired chamber partitioning. However, as previously discussed, valves with an alternate number of chambers have been contemplated. Further, the second wall 154 is positioned perpendicular to the pivot 124 to enable the chambers to have a desired volume. In an alternative configuration, the second wall 154 may be positioned at an angle that is greater than or less than 90° with regard to pivot.

Figure 5:
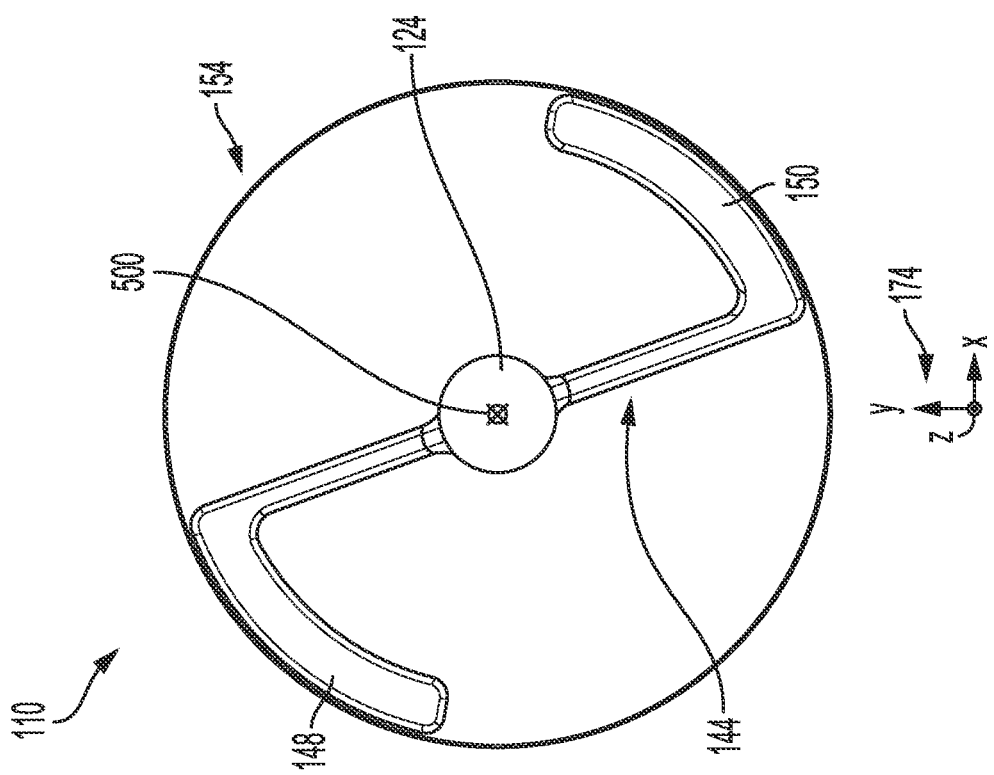
FIG. 5 is a top view of the cartridge, depicted in FIG. 2.

FIG. 5 depicts a top view of the removable rotatable cartridge 110 with the first wall 144, the pivot 124, and the second wall 154. In the x-y plane, the second wall 154 has a circular peripheral profile to allow the removable rotatable cartridge 110 to be rotated within the housing. Further, the extensions 148, 150 of the first wall 144, are again depicted. An axis 500 about which the pivot 124 rotates during valve adjustment is further provided for reference in FIG. 5.

FIGS. 6A-6D depict different flow paths established between the ports 128, 129, 130, 131, 132, 133, 134, 135 in different valve configurations. In these different configuration, the wall extension openings create fluidic connections between the various ports 128, 129, 130, 131, 132, 133, 134, 135. These fluidic connections are dictated by the pivot angle of the removable rotatable cartridge 110. In other examples, the valve may be designed with alternate flow paths by molding the walls the form "Z" shaped features on one or both sides of the cartridge, in alternate locations. In this way, different flow configurations may be achieved using the same valve body, thereby expanding the valve's applicability and reducing manufacturing complexity. In this alternate example, flow paths may be established between the ports 128 and 134 and ports 129 and 133.

Figure 6A:
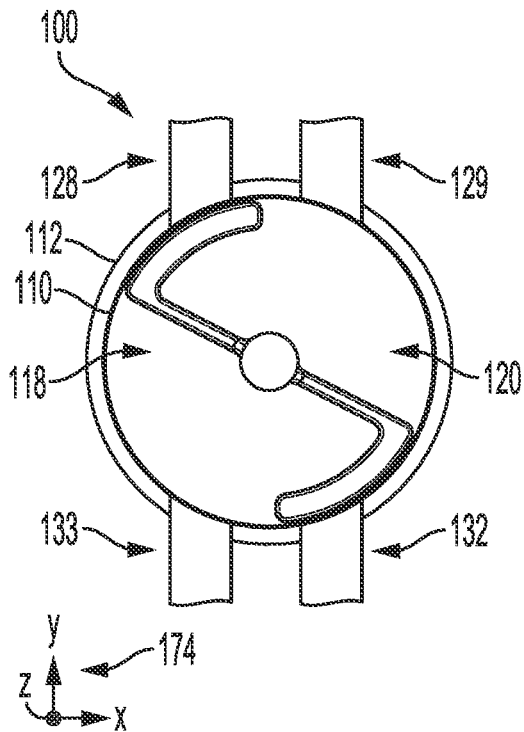
FIGS. 6A-6D are illustrations of the valve, depicted in FIG. 1, in different flow configurations.
Figure 6B:
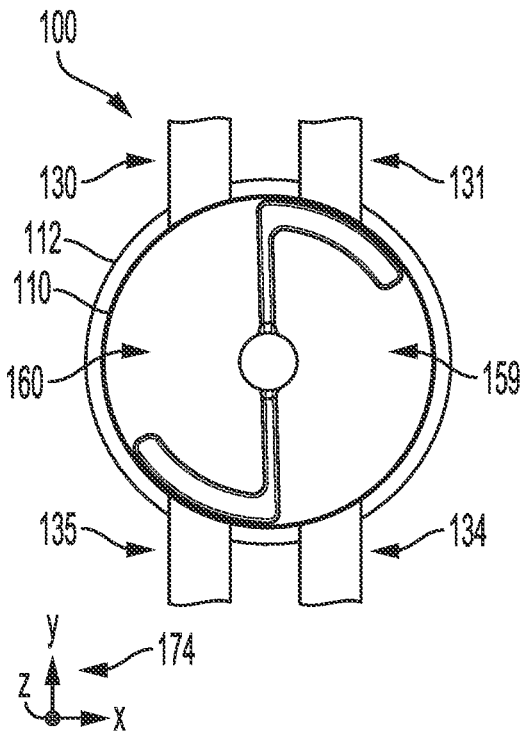
Figure 6C:
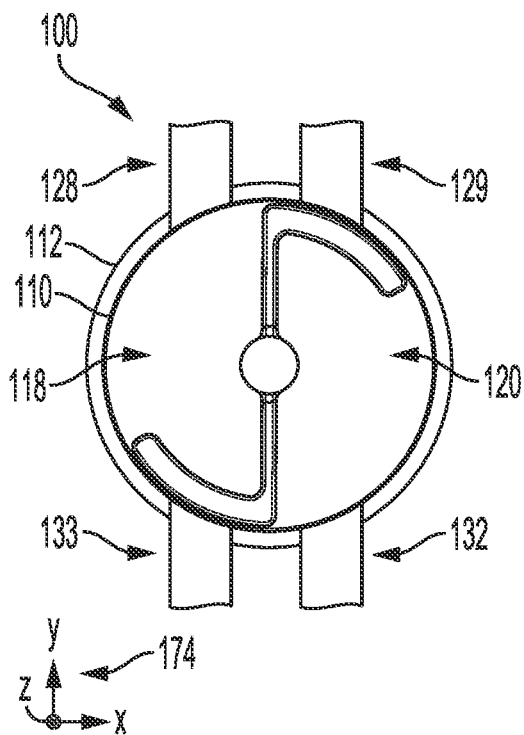
Figure 6D:
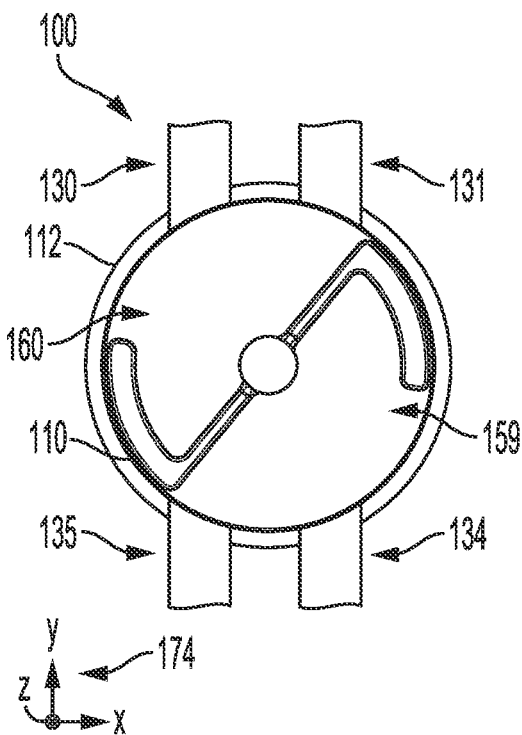

FIGS. 6A and 6B illustrate the valve 100 in a first flow configuration and FIGS. 6C and 6D illustrate the valve 100 in a second flow configuration where the removable rotatable cartridge 110 has been rotated by a predetermined amount. In particular, FIG. 6A illustrates the first and second chambers 118, 120 and FIG. 6B illustrated the third and fourth chambers 159, 160 in the first flow configuration. On the other hand, FIG. 6C illustrates the first and second chambers 118, 120 and FIG. 6D illustrated the third and fourth chambers 159, 160 in the second flow configuration.

As indicated above, the position of the removable rotatable cartridge 110 relative to the housing body 112 may be adjusted via the electronic actuator 165 illustrated in FIG. 1.

Specifically, in the illustrated embodiment, rotation of the cartridge by approximately 30° relative to the housing body 112 changes the flow configuration of the valve and permit different ports to fluidically communicate with the chambers. However, in alternate embodiments, the valve may be designed to change flow configuration when the valve cartridge is rotated by an alternate amount. For instance, the angle of rotation which alters the valve's flow configuration may be less or greater than 30°.

As shown in FIG. 6A, in the first flow configuration, ports 132, 133 are in fluidic communication with the first chamber 118, and ports 128, 129 are in fluidic communication with the second chamber 120.

As shown in FIG. 6B, in the first flow configuration, ports 131, 134 are in fluidic communication with the third chamber 159, and ports 130, 135 are in fluidic communication with the fourth chamber 160.

As shown in FIG. 6C, in the second flow configuration, ports 128, 133 are in fluidic communication with the first chamber 118, and ports 129, 132 are in fluidic communication with the second chamber 120.

As shown in FIG. 6D, in the second flow configuration, ports 134, 135 are in fluidic communication with the third chamber 159, and ports 130, 131 are in fluidic communication with the fourth chamber 160.

Figure 7:
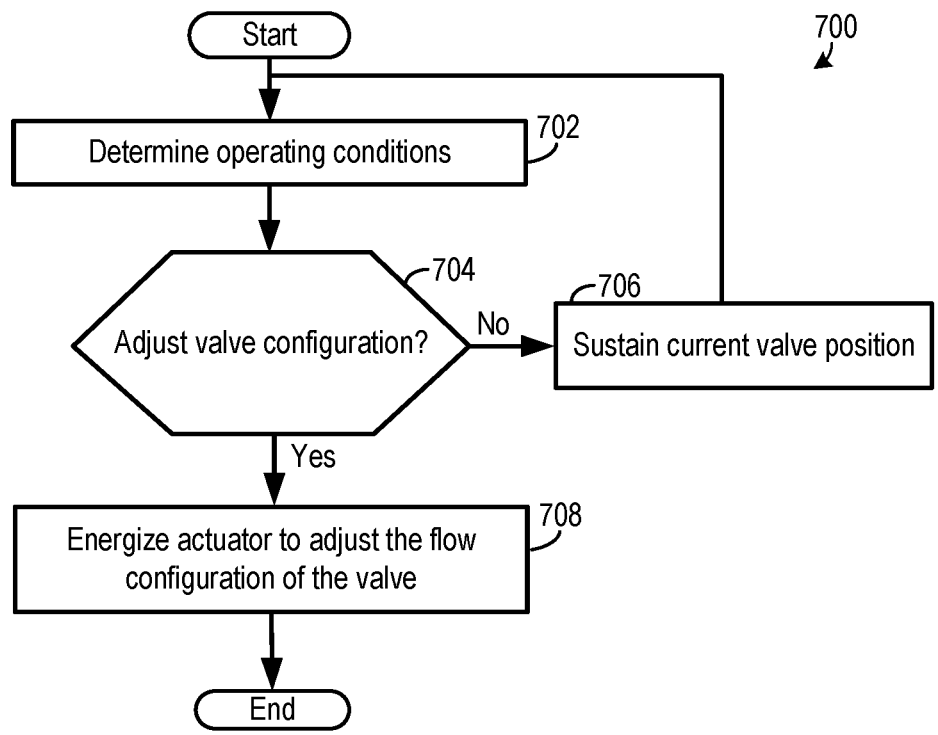
FIG. 7 is a method for operation of a valve.

FIG. 7 illustrates a method 700 for operation of a valve. The method 700 may be used to operate the valve discussed above with regard to FIGS. 1-6D. However, the method may be used to operate other suitable valves in alternate embodiments. Furthermore, the method 700 may be implemented by a controller that includes a processor and memory, as previously discussed.

At 702, the method includes determining operating conditions. The operating conditions may include coolant temperature, motor temperature, battery temperature, motor speed, vehicle speed, vehicle load, ambient temperature, and the like. The operating conditions may be ascertained via sensor inputs, modeling, look-up tables, and other suitable techniques. Further, the valve adjustment method is discussed in relation to an EV cooling system. However, as previously indicated, the valve may be used in a variety of cooling systems.

Next at 704, the method includes judging if the valve's configuration should be adjusted. Such a determination may be carried out responsive to battery or motor temperature exceeding or falling below a threshold value, for instance.

If it is determined that the valve should not be reconfigured (NO at 704) the method moves to 706 where the method includes sustaining the valve's current position. Conversely, if it is determined that the valve should be reconfigured (YES at 704) the method moves to 708 where the method includes energizing the actuator which is coupled to the cartridge's pivot to adjust the flow configuration of the valve. In this way, the valve may be efficiently adjusted based on vehicle operating conditions.

The technical effect of the valve operating method described herein is to efficiently transition between valve configurations for maintaining selected EV components in desired temperature ranges.

FIGS. 1-6D are drawn approximately to scale, aside from the schematically depicted components in these figures. However, other relative component dimensions may be used, in other embodiments.

FIGS. 1-6D show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention is further described in the following paragraphs. In one aspect, a valve is provided that comprises a rotatable cartridge that includes a pivot and a first wall that intersects and demarcates a first chamber and a second chamber; and a housing including a body that at least partially encloses the rotatable cartridge and includes at least four ports; and a cap removably coupled to the housing and sealing the first chamber and the second chamber; wherein rotation of the rotatable cartridge about the pivot creates multiple flow paths between the at least four ports.

In another aspect, a method for controlling a valve is provided that comprises rotating a cartridge in a housing to alter a flow pattern between a first chamber, a second chamber, and a plurality of ports in the housing based on one or more operating conditions; wherein the valve includes the cartridge that includes a central pivot and a first wall that intersects the central pivot and forms a least a portion of a boundary of both the first chamber and the second chamber; and the housing with a set of ports disposed at different radial positions.

In yet another aspect, a coolant valve for an electric vehicle (EV) cooling system is provided that, comprises a rotatable cartridge that includes a first wall that divides a first chamber from a second chamber and intersects a pivot; a second wall that extends through the pivot; and a seal circumferentially extending around a periphery of the second wall and in contact with an inner surface of a body of a housing; wherein the housing encloses the rotatable cartridge and including multiple ports; and wherein rotation of the rotatable cartridge alters a flow pattern between the multiple ports and the first and second chambers.

In any of the aspects or combinations of the aspects, the first wall may include: a first extension that circumferentially extends around the rotatable cartridge in a first direction and includes a first opening; and a second extension that circumferentially extends around the rotatable cartridge in a second direction that is opposite to the first direction and may include a second opening.

In any of the aspects or combinations of the aspects, the first extension and the second extension each may include a seal in contact with an inner surface of the body of the housing and extending around the first opening and the second opening.

In any of the aspects or combinations of the aspects, the seals may include polytetrafluoroethylene (PTFE).

In any of the aspects or combinations of the aspects, the rotatable cartridge may include a second wall; a portion of the second wall may form a portion of a boundary of the first and second chambers.

In any of the aspects or combinations of the aspects, the rotatable cartridge may include a third wall that may intersect the pivot and may demarcate a third chamber and a fourth chamber; the third wall may include a first extension that circumferentially extends around the rotatable cartridge in the second direction and may include a first opening; and the third wall may include a second extension that circumferentially extends around the rotatable cartridge in the first direction and may include a second opening.

In any of the aspects or combinations of the aspects, the rotatable cartridge may further include a seal that circumferentially extends around the outer edge and is in contact with the inner surface of the body of the housing.

In any of the aspects or combinations of the aspects, the cap may include an opening that mates with and seals a portion of the pivot.

In any of the aspects or combinations of the aspects, the at least four ports may include four ports with different radial positions with regard to the pivot.

In any of the aspects or combinations of the aspects, the valve may further comprise an electronic actuator coupled to the pivot; and a controller may include instructions stored in non-transitory memory that when executed during a first operating condition, cause the controller to rotate the rotatable cartridge to adjust the flow path between the at least three inlet ports, the at least three outlet ports, the first chamber, and/or the second chamber.

In any of the aspects or combinations of the aspects, rotating the cartridge may include rotating the cartridge into a first angular position in relation to the housing to establish fluidic communication between a first port and a second port in the set of ports with the first chamber and a third port and a fourth port in the set of ports with the second chamber.

In any of the aspects or combinations of the aspects, the valve may further comprise rotating the cartridge into a second angular position in relation to the housing to establish fluidic communication between the first port and the third port with the first chamber.

In any of the aspects or combinations of the aspects, the coolant valve may be designed to operate in a first configuration in which a first port and a second port in the multiple ports are in fluidic communication with the first chamber and a third port and fourth port in the multiple ports are in fluidic communication with the second chamber; and the coolant valve may be configured to operate in a second configuration in which the first port and the third port are in fluidic communication with the first chamber and the second port and the fourth port are in fluidic communication with the second chamber.

In any of the aspects or combinations of the aspects, the rotatable cartridge may include a third wall that divides a third chamber from a fourth chamber and intersects the pivot.

In any of the aspects or combinations of the aspects, at least a portion of the ports in the set of ports may be in fluidic communication with one or more coolant passages in a traction battery.

In any of the aspects or combinations of the aspects, at least a portion of the ports in the set of ports may be in fluidic communication with one or more coolant passages in a traction motor.

In another representation, a switching valve in an electric vehicle (EV) is provided that comprises at least four ports in a housing and a removable cartridge that includes a radially aligned wall that extends through a central pivot about which the valve rotates, where rotation of the removable cartridge alters the flow pattern between two chambers in the switching valve whose boundary is partially defined by the radially aligned wall.

Note that the example control and estimation routines included herein can be used in coolant valve system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer-readable storage medium in the electric drive unit and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations, and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range, unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A valve, comprising:
a rotatable cartridge that includes a pivot and a first wall that intersects and demarcates a first chamber and a second chamber; and
a housing including:
a body that at least partially encloses the rotatable cartridge and includes at least four ports; and
a cap removably coupled to the housing and sealing the first chamber and the second chamber;
wherein rotation of the rotatable cartridge about the pivot creates multiple flow paths between the at least four ports; and
wherein the first wall includes:
a first extension that circumferentially extends around the rotatable cartridge in a first direction and includes a first opening; and
a second extension that circumferentially extends around the rotatable cartridge in a second direction that is opposite to the first direction and includes a second opening.

2. The valve of claim 1, wherein the cap includes an opening that mates with and seals a portion of the pivot.

3. The valve of claim 1, wherein the at least four ports have different radial positions with regard to the pivot.

4. The valve of claim 1, wherein the first extension and the second extension each include a seal in contact with an inner surface of the body of the housing and extending around the first opening and the second opening.

5. The valve of claim 4, wherein a seals include polytetrafluoroethylene (PTFE).

6. The valve of claim 1, wherein:
the rotatable cartridge includes a second wall; and
a portion of the second wall forms the portion of a boundary of the first chamber and the second chamber.

7. The valve of claim 6, wherein:
the rotatable cartridge includes a third wall that intersects the pivot and demarcates a third chamber and a fourth chamber;
the third wall includes the first extension that circumferentially extends around the rotatable cartridge in the second direction and includes the first opening; and
the third wall includes the second extension that circumferentially extends around the rotatable cartridge in the first direction and includes the second opening.

8. The valve of claim 7, wherein the rotatable cartridge further includes a seal that circumferentially extends around an outer edge and is in contact with an inner surface of the body of the housing.

9. The valve of claim 8, wherein the seal includes polytetrafluoroethylene (PTFE).

10. A valve, comprising:
a rotatable cartridge that includes a pivot and a first wall that intersects and demarcates a first chamber and a second chamber;
a housing including:
a body that at least partially encloses the rotatable cartridge and includes multiple ports;
a cap removably coupled to the housing and sealing the first chamber and the second chamber; and
an electronic actuator coupled to the pivot; and
a controller including instructions stored in non-transitory memory that when executed, during a first operating condition, cause the controller to:
rotate the rotatable cartridge to adjust a flow path between an outlet port in the multiple ports, an inlet port in the multiple ports, the first chamber, and/or the second chamber;
wherein rotation of the rotatable cartridge about the pivot creates multiple flow paths between the multiple ports.

11. The valve of claim 10, wherein the valve is included in a cooling system.

12. The valve of claim 11, wherein the cooling system is an electric vehicle (EV) cooling system.

13. The valve of claim 10, wherein a working fluid in the valve includes water.

14. A coolant valve for an electric vehicle (EV) cooling system, comprising:
a rotatable cartridge that includes:
a first wall that divides a first chamber from a second chamber and intersects a pivot;
a second wall that extends through the pivot; and
a seal circumferentially extending around a periphery of the second wall and in contact with an inner surface of a body of a housing;
wherein the housing encloses the rotatable cartridge and including multiple ports; and
wherein rotation of the rotatable cartridge alters a flow pattern between the multiple ports a first and second chambers.

15. The coolant valve of claim 14, wherein:
the coolant valve is designed to operate in a first configuration in which a first port and a second port in the multiple ports are in fluidic communication with the first chamber and a third port and fourth port in the multiple ports are in fluidic communication with the second chamber; and
the coolant valve is configured to operate in a second configuration in which the first port and the third port are in fluidic communication with the first chamber and the second port and the fourth port are in fluidic communication with the second chamber.

16. The coolant valve of claim 15, wherein the rotatable cartridge includes a third wall that divides a third chamber from a fourth chamber and intersects the pivot.

17. The coolant valve of claim 16, wherein the first wall and the third wall intersect the pivot at different angles.

18. The coolant valve of claim 14, wherein at least a portion of a port in a set of ports are in fluidic communication with one or more coolant passages in a traction battery.

19. The coolant valve of claim 14, wherein at least a portion of a port in a set of ports are in fluidic communication with one or more coolant passages in a traction motor.

* * * * *